3,179,493
USE OF A FLUORIDE ADDITIVE IN THE PRECIPITATION OF CALCIUM CARBONATE

Heinrich Diekmann and Karl Heinz Zapp, Ludwigshafen (Rhine), Germany, assignors to Badische Anilin- & Soda-Fabrik Aktiengesellschaft, Ludwigshafen (Rhine), Germany
No Drawing. Filed Dec. 14, 1962, Ser. No. 244,558
Claims priority, application Germany, Aug. 31, 1960,
B 59,172
4 Claims. (Cl. 23—66)

This invention relates to a process for the production of finely divided calcium carbonate. More particularly, the invention relates to the production of finely divided, substantially pure calcium carbonate from aqueous calcium salt solutions by precipitation with carbonates.

In the paper and dye industries, in the pharmaceutical and cosmetics industries and also in the rubber industry, precipitated calcium carbonate is used which should be as finely divided as possible. It is known to produce calcium carbonate of this kind by reacting calcium salt solutions with ammonium or alkali metal carbonate solutions in the presence of additives which are added to the reaction mixture during or after the reaction to prevent formation of large crystals or agglomeration of the finely divided $CaCO_3$ primarily formed. In the known processes it is preferred to use as additives surface-active substances, for example organic sulfonates, alkyl amines or aryl amines, derivatives of higher fatty acids and the like. It is also known to use, as additives, complex-forming substances, for example salts of polybasic organic hydroxyacids, such as citrates or tartrates, or the so-called condensed phosphates, such as sodium tripolyphosphate or sodium hexametaphosphate. The considerable amounts of the substances used—about 20 parts of additive to 100 parts of calcium carbonate—may be reduced in known manner by the addition of a soluble fluoride or silicofluoride by up to half the amount necessary without the addition of a soluble fluoride or silicofluoride. These processes have the disadvantage that both the calcium carbonate and also the solution of alkali metal or ammonium salts which are formed simultaneously are heavily contaminated by the additives. The latter interfere especially with the processing of these alkali metal or ammonium salt solutions.

It is an object of the present invention to provide a process for the production of finely divided calcium carbonate. Another object of the invention is to provide a process for the production of finely divided calcium carbonate which is substantially free from impurities. A further object of the invention is to provide a process for the production of finely divided calcium carbonate which when dispersed in water has a low settling velocity. These and other objects and advantages of the invention are achieved by precipitating calcium carbonate in the presence of small amounts of soluble fluoride or silicofluoride as the sole active substance for producing the fine division. Even very small amounts of such fluorine compounds are sufficient for producing a finely divided $CaCO_3$. Calcium carbonate prepared with small amounts of fluorine compounds contains less than 0.1% F and the ammonium or alkali metal salt solution which is formed simultaneously contains no detectable amounts of fluorine. By the process according to the present invention, therefore, the calcium carbonate and the ammonium or alkali metal salt solutions are obtained in high purity. The process may be carried out batchwise or continuously. When carrying out the process continuously, the reaction components are preferably introduced into a reaction vessel provided with an overflow or into a mixing nozzle.

The present invention is limited to the sole addition of fluorine compounds as substances producing the fine division. Admixture of substances inert in this respect, for example alkali metal or ammonium salts other than fluorides or silicofluorides, is possible.

Suitable fluorides include water-soluble fluorides, such as potassium fluoride, sodium fluoride or ammonium fluoride.

Suitable silicofluorides include potassium silicofluoride, sodium silicofluoride and ammonium silicofluoride.

The content of fluoride or silicofluoride in the solution used for precipitation may be large or small. We prefer to apply from 0.05 to 5 parts by weight of fluoride or silicofluoride per 100 parts by weight of carbonate. Only a slight contamination of the precipitated calcium carbonate occurs by using small amounts of fluoride (0.05% by weight) but the precipitated calcium carbonate is not so finely divided as when using larger amounts of fluoride. A very finely divided calcium carbonate is produced by using about 5% by weight of fluoride, but the fluoride content of the calcium carbonate increases above 0.1%. In no case can fluoride be detected in the filtrate which is separated after precipitation of the calcium carbonate.

By calcium salt solutions we understand aqueous solutions of calcium salts, for example calcium nitrate or calcium chloride. By carbonates we understand ammonium carbonate, sodium carbonate and potassium carbonate.

Application of definite temperatures, speeds of stirring or pH-values during the reaction is unnecessary. Filtration of the $CaCO_3$ produced in accordance with this invention may be carried out a long time after the reaction without trouble.

The fine division of the $CaCO_3$ prepared according to this process is especially apparent from the high settling volume of a suspension in water. Whereas $CaCO_3$, which has been precipitated without the addition of fluorine compounds, in a suspension of 100 cm.$^3$ has a settling volume of 50 to 60 cm.$^3$/10 g. of $CaCO_3$ after 2 hours, $CaCO_3$ which was precipitated under otherwise similar conditions after an addition of a potassium fluoride solution of 95 to 99 cm.$^3$/10 g. $CaCO_3$.

The invention is illustrated by, but not limited to, the following examples.

Example 1

Calcium carbonate is precipitated from a five percent aqueous calcium chloride solution by the introduction with stirring of an approximately equivalent amount of a forty percent aqueous ammonium carbonate solution which contains 0.2% of potassium fluoride. The ammonium carbonate solution contains 0.5 part by weight of potassium fluoride per 100 parts by weight of ammonium carbonate. A stiff, creamy reaction mixture is formed by the precipitation. When precipitation is complete, the mixture is stirred for two more minutes and then filtered. The calcium carbonate produced in this way has a particle size of 0.1$\mu$ and contains 0.09% F. The filtrate is free from fluorine. The settling volume of a suspension of 10 grams of the calcium carbonate thus obtained in 100 cm.$^3$ of water is 99 cm.$^3$ after 2 hours. No further sedimentation is observed within the subsequent 24 hours.

If a five percent solution of calcium chloride is precipitated in known manner by addition of a soda solution which contains 10 parts by weight of alkali polyphosphate and 3 parts by weight of sodium silicofluoride to 100 parts by weight of soda, under otherwise similar conditions as described in the above experiment, a finely divided calcium carbonate is also obtained. The reaction mixture, however (precipitate and solution), contains 13 parts by weight of impurities to 100 parts by weight of precipitating agent, compared with only 0.5 part when working in accordance with the process of the present invention.

*Example 2*

From a 5% aqueous solution of calcium chloride, calcium carbonate is precipitated by adding an about equivalent amount of a 40% aqueous solution of ammonium carbonate containing 0.2% ammonium fluoride, with agitation. The ammonium carbonate solution contains 0.5 part by weight ammonium fluoride to 100 parts by weight ammonium carbonate. The precipitate is a stiff, creamy mixture which is stirred for about two more minutes when precipitation is complete. The calcium carbonate produced in this way has a particle size of $0.1\mu$ and contains 0.08% F. The filtrate is free of fluoride. The settling volume of a suspension of 10 grams of the calcium carbonate thus obtained in 100 cm.$^3$ of water is 99.5 cm.$^3$ after 2 hours.

This application is a continuation-in-part of our application Serial No. 133,787, filed August 25, 1961, now abandoned.

What we claim is:

1. In a process for the production of finely divided precipitated calcium carbonate by the reaction of a calcium salt solution with a solution of a carbonate selected from the group consisting of sodium carbonate, potassium carbonate, ammonium carbonate and mixtures thereof in the presence of an additive which produces a fine division of the calcium carbonate, the improvement which comprises precipitating said calcium carbonate in the presence of a small amount of a compound selected from the group consisting of potassium fluoride, sodium fluoride, ammonium fluoride, potassium silicofluoride, sodium silicofluoride and ammonium silicofluoride as the sole active additive substance for producing said fine division.

2. A process as claimed in claim 1 wherein said precipitation is carried out in the presence of 0.5 to 5 parts by weight of said active additive substance per 100 parts by weight of said carbonate.

3. A process as claimed in claim 2 wherein the active additive substance is ammonium fluoride.

4. A process as claimed in claim 2 wherein the active additive substance is potassium fluoride.

References Cited by the Examiner

UNITED STATES PATENTS

| | | | |
|---|---|---|---|
| 2,399,206 | 4/46 | Castner et al. | 252—324 |
| 3,003,010 | 10/61 | Meurat et al. | 23—66 X |

FOREIGN PATENTS

| | | |
|---|---|---|
| 474,159 | 10/37 | Great Britain. |
| 831,921 | 4/60 | Great Britain. |

MAURICE A. BRINDISI, *Primary Examiner.*